(12) United States Patent
Yang et al.

(10) Patent No.: US 11,240,444 B2
(45) Date of Patent: Feb. 1, 2022

(54) DISPLAY PANEL, DISPLAY DEVICE AND IMAGE ACQUIRING METHOD THEREOF

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yi Yang, Beijing (CN); Huaxu Yang, Beijing (CN); Libao Cui, Beijing (CN); Jinming Zhu, Beijing (CN); Jiaxing Chen, Beijing (CN); Zhiheng Wu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 195 days.

(21) Appl. No.: 16/452,923

(22) Filed: Jun. 26, 2019

(65) Prior Publication Data
US 2020/0106939 A1    Apr. 2, 2020

(30) Foreign Application Priority Data
Sep. 30, 2018    (CN) .......................... 201811162881.1

(51) Int. Cl.
*H04N 5/238* (2006.01)
*G02F 1/1335* (2006.01)
*H04N 5/225* (2006.01)

(52) U.S. Cl.
CPC ....... *H04N 5/238* (2013.01); *G02F 1/133528* (2013.01); *H04N 5/2254* (2013.01); *H04N 5/2258* (2013.01)

(58) Field of Classification Search
CPC .............. H01L 27/1464; H04N 1/0316; H04N 13/0271; H04N 13/00; G06T 2207/10028; G06K 9/00389; G06F 3/017; G09G 3/36
(Continued)

(56) References Cited

U.S. PATENT DOCUMENTS 10,754,373 B2    8/2020  Kwak et al.
2006/0001914 A1*  1/2006  Mesmer ................ H04N 1/028
                                                358/401

(Continued)

FOREIGN PATENT DOCUMENTS

CN    103365354 A    10/2013
CN    106918964 A     7/2017
(Continued)

OTHER PUBLICATIONS

First Chinese Office Action from Chinese Patent Application No. 201811162881.1 dated Nov. 26, 2020.

*Primary Examiner* — Xi Wang
(74) *Attorney, Agent, or Firm* — Dilworth & Barrese, LLP.; Michael J. Musella, Esq.

(57) ABSTRACT

Embodiments of the present disclosure provide a display panel, a display device and an image acquiring method thereof. The display panel includes a first imaging region, the first imaging region is provided with a filter, the filter is configured to adjust a polarization direction of light incident into the filter, and configured to filter out polarized light having a set polarization direction in the adjusted light.

17 Claims, 7 Drawing Sheets

(58) Field of Classification Search
USPC .................. 257/447; 382/154; 352/57–65;
396/324–331; 348/46–50
See application file for complete search history.

(56) References Cited

U.S. PATENT DOCUMENTS

| | | | |
|---|---|---|---|
| 2010/0007716 A1* | 1/2010 | Lee ..................... | H04N 13/341 |
| | | | 348/43 |
| 2013/0258234 A1 | 10/2013 | Park et al. | |
| 2016/0364008 A1* | 12/2016 | Chun ..................... | G06F 3/017 |
| 2019/0280076 A1 | 9/2019 | Bang et al. | |
| 2020/0195818 A1 | 6/2020 | Li et al. | |

FOREIGN PATENT DOCUMENTS

| | | |
|---|---|---|
| CN | 108566504 A | 9/2018 |
| EP | 0511644 A2 | 11/1992 |

* cited by examiner (a)          (b)

DISPLAY PANEL, DISPLAY DEVICE AND IMAGE ACQUIRING METHOD THEREOF

TECHNICAL FIELD

The present disclosure relates to a display panel, a display device and an image acquiring method thereof.

BACKGROUND

With rapid development of electronic apparatus technology and popularity of electronic apparatuses, functions of the electronic apparatuses are becoming more and more powerful, and people can learn, play, take photos, etc. through the electronic apparatuses. As people's requirements for photographing are getting higher, there are more and more electronic apparatuses having two cameras, for example, smartphones with dual cameras.

A dual-camera module combining two camera components develops from a solution of two sets of symmetrical photosensitive elements in the beginning, to a solution of clearly differentiating between a main camera and an auxiliary camera, even to a solution of coordinating a main camera and an auxiliary camera as color & black-and-white, or wide-angle & long-focus, etc. at present; and these different solutions may implement special functions such as depth blur, lossless optical zoom, and dark light enhancement.

However, in a photographing process, an angle of against the light is usually not selected, in which case, light of an object to be photographed is mainly reflected light of natural light; when there is a highly reflective object (e.g., a mirror) or a strongly reflective background (e.g., wall, water surface, or road surface) in a photographed scene, a photographic effect will be greatly affected by strong reflected light.

SUMMARY

Embodiments of the present disclosure provide a display panel, a display device and an image acquiring method thereof, for solving, to a certain extent, a problem that an image acquisition effect is influenced by strong reflected light in a photographed scene.

At a first aspect, an embodiment of the present disclosure provides a display panel, the display panel comprises a first imaging region, the first imaging region is provided with a filter, the filter is configured to adjust a polarization direction of light incident into the filter, and configured to filter out polarized light having a set polarization direction in the adjusted light.

Optionally, the filter is controllable, such that the polarization direction of the adjusted light is variable.

Optionally, the filter includes a polarization direction adjuster and an optical filter, the polarization direction adjuster is configured to adjust the polarization direction of the light incident into the filter, the optical filter is provided on a light emergent side of the polarization direction adjuster and configured to filter out the polarized light having the set polarization direction in the adjusted light.

Optionally, the polarization direction adjuster includes a liquid crystal cell, and the optical filter includes a first polarizer located on a light emergent side of the liquid crystal cell; the liquid crystal cell includes a first liquid crystal layer, a first electrode and a second electrode which are configured to drive the first liquid crystal layer to deflect.

Optionally, the display panel further comprises a display region, the display region is provided with a display unit, the display unit is configured to display an image, the display unit includes a second liquid crystal layer, a pixel electrode, a common electrode and a lower polarizer, the pixel electrode and the common electrode are configured to drive the second liquid crystal layer to display an image, the lower polarizer is located on a light emergent side of the second liquid crystal layer or an opposite side of the light emergent side of the second liquid crystal layer.

Optionally, the lower polarizer and the first polarizer are integrally formed.

Optionally, the first electrode and the pixel electrode are provided in a same layer and made of a same material, and the second electrode and the common electrode are provided in a same layer and made of a same material.

Optionally, the second liquid crystal layer and the first liquid crystal layer are provided in a same layer and made of a same material.

Optionally, The display panel further comprises an insulation barrier, the insulation barrier is provided between the first liquid crystal layer and the second liquid crystal layer in a direction parallel to the display panel and configured to isolate the first liquid crystal layer from the second liquid crystal layer.

Optionally, The display panel further comprises a second imaging region, the second imaging region is provided with a light transmitting unit, and the light transmitting unit is configured to transmit light incident into the light transmitting unit; the light transmitting unit is a hollow portion; or, the display unit includes a first transparent base and a second transparent base, the first transparent base and the second transparent base sandwich the second liquid crystal layer, the pixel electrode and the common electrode, and the light transmitting unit includes portions of the first transparent base and the second transparent base that extend to the second imaging region.

At a second aspect, an embodiment of the present disclosure provides a display device, the display device comprises a display panel disclosed by the first aspect and a first camera, the first camera is provided on a light emergent side of the filter and corresponding to the first imaging region in a position.

Optionally, the display panel comprises a second imaging region, the second imaging region is provided with a light transmitting unit, and the light transmitting unit is configured to transmit light incident into the light transmitting unit; the display device further comprises a second camera provided on a light emergent side of the light transmitting unit.

Optionally, the light emergent side of the light transmitting unit and the light emergent side of the filter are located on a same side and are located on a light emergent side of the display device or an opposite side of the light emergent side of the display device, the display device further comprises a backlight module, the backlight module includes a first hollow region, and the first camera is provided in the first hollow region; the backlight module includes a second hollow region, and the second camera is provided in the second hollow region.

At a third aspect, an embodiment of the present disclosure provides an image acquiring method of the display device according to the second aspect, the acquiring method comprises: controlling a first camera to acquire a plurality of first images, wherein, a polarization direction of light of at least one image is not varied, and controlling a filter to vary a polarization direction of light incident into the filter, before the first camera acquires each of the remaining first images except for the at least one first image; determining a target reflective region; and selecting one of the first images whose target reflective region has a lowest luminance among the plurality of first images, to acquire a target image.

Optionally, the selecting one of the first images whose target reflective region has the lowest luminance among the plurality of first images, to acquire a target image, includes: selecting one of the first images whose target reflective region has the lowest luminance among the plurality of first images as a filtered image; performing luminance compensation on the filtered image according to a filtering degree of the filter, to acquire the target image.

Optionally, the filter includes a first liquid crystal layer, a first electrode and a second electrode, the first electrode and the second electrode are configured to drive the first liquid crystal layer to deflect; the controlling a filter to vary a polarization direction of light incident into the filter, before the first camera acquires each of the remaining first images except for the at least one first image includes: applying a voltage to the first electrode and the second electrode for a different first image in the remaining first images except for the at least one first image, so that the first electrode and the second electrode have different voltage differences, to control liquid crystal molecules in the first liquid crystal layer to deflect by a set angle, the liquid crystal molecules deflecting by different set angles for the different first images.

Optionally, the display device comprises a second camera; the image acquiring method further comprises: controlling the second camera to acquire a second image, while the first camera is acquiring the plurality of first images.

Optionally, the first image and the second image respectively include a plurality of pixels, the determining a target reflective region includes: comparing luminance of the plurality of first images at a same pixel, taking a region composed of pixels whose luminance fluctuations are larger than a set value as a first estimated reflective region, and taking the first estimated reflective region as the target reflective region; or, acquiring an average luminance value of pixels in the second image, taking a region composed of pixels whose luminance is larger than the average luminance value as a second estimated reflective region, and taking the second estimated reflective region as the target reflective region; or, comparing luminance of the plurality of first images at the same pixel, taking the region composed of the pixels whose luminance fluctuations are larger than the set value as the first estimated reflective region, acquiring the average luminance value of the pixels in the second image, taking the region composed of the pixels whose luminance is larger than the average luminance value as the second estimated reflective region, and taking a region composed of pixels located in both the first estimated reflective region and the second estimated reflective region as the target reflective region.

Optionally, the first image and the second image respectively include a plurality of pixels, the performing luminance compensation on the filtered image according to a filtering degree of the filter, to acquire the target image includes: acquiring a luminance ratio of the second image to the filtered image in a non-reflective region at a same pixel; wherein, the non-reflective region is a region other than the target reflective region; and enhancing luminance of each of the pixels of the filtered image according to the luminance ratio, to generate the target image.

Optionally, the first image and the second image respectively include a plurality of pixels, and the performing luminance compensation on the filtered image according to a filtering degree of the filter, to acquire the target image includes: acquiring the luminance ratio of the second image to the filtered image in the non-reflective region at the same pixel; wherein, the non-reflective region is a region other than the target reflective region; enhancing the luminance of each of the pixels in the target reflective region of the filtered image according to the luminance ratio; and replacing luminance of each of the pixels in the target reflective region of the second image with luminance of each of the pixels in the target reflective region of the filtered image after luminance enhancement, to generate the target image.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

REFERENCE SIGNS

100—display panel; 01—display region; 02—first imaging region; 03—second imaging region; 10—filter; 11—liquid crystal cell; 111—first liquid crystal layer; 112—first electrode; 113—second electrode; 12—first polarizer; 20—display unit; 21—lower polarizer, 22—pixel electrode; 23—common electrode; 24—second liquid crystal layer; 30—insulation barrier; 40—light transmitting unit; 200—first camera; 300—backlight module; 310—first hollow region; 320—second hollow region; 400—second camera.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

Figure 1:
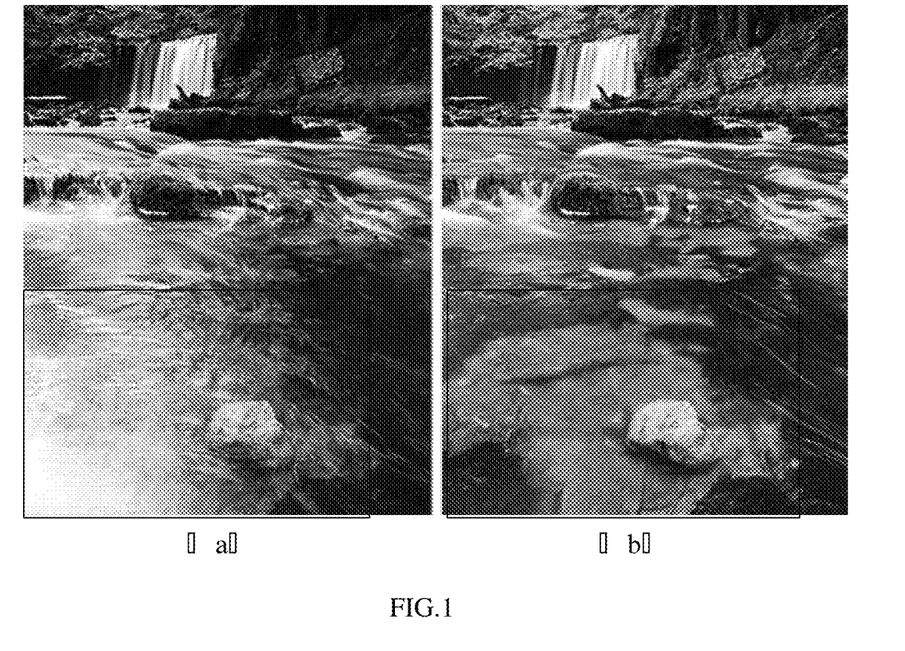
FIG. 1 is a comparison view before and after reflected light is filtered out provided by an embodiment of the present disclosure.

In a photographing process, strong reflected light has a great influence on a photographic effect, exemplarily, as shown in FIG. 1, in a same photographed scene, (a) in FIG. 1 is a photographed picture when strong reflected light is not filtered out in the photographing process, and (b) in FIG. 1 is a photographed picture after the strong reflected light is filtered out in the photographing process; there is an obvious difference between the two, and contrast between box regions of (a) and (b) in FIG. 1 is the most obvious. Wherein, strong reflected light of an object surface mostly comes from mirror reflection by, for example, a water surface, a glass curtain wall, and other object having a glossy surface; and the strong reflected light has two characteristics as below: one is partially polarized light whose polarization angle is relatively concentrated, which is even linearly polarized light at a certain angle; and the other is stronger luminance.

Based on the characteristics of the strong reflected light, an embodiment of the present disclosure provides a display panel, comprising: a first imaging region 02, the first imaging region 02 being provided therein with a filter, wherein, the filter is configured to adjust a polarization direction of light incident into the filter, and configured to filter out polarized light having a set polarization direction in the adjusted light.

Optionally, the filter is controllable, such that the polarization direction of the adjusted light is variable. That is, the filter can be controlled to make the polarization direction of the adjusted light variable, in which way the filter may fix or vary the polarization direction of the adjusted light.

Figure 2:
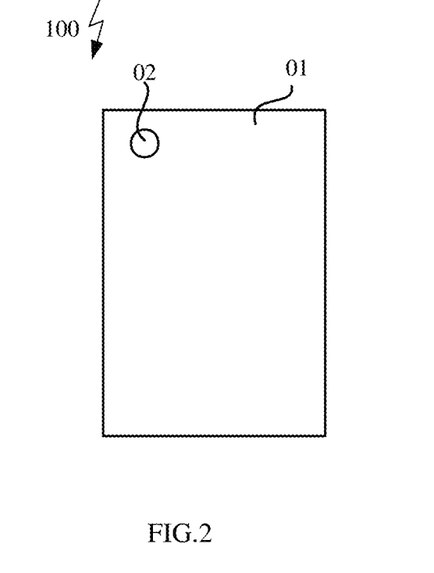
FIG. 2 is a region division diagram I of a display panel provided by an embodiment of the present disclosure.

As shown in FIG. 2, a display panel 100 comprises a display region 01 and a first imaging region 02, the display region 01 is provided with a display unit, the display unit is used for displaying a picture; the first imaging region 02 is provided with a filter, and the filter is configured to adjust a polarization direction of light incident into the filter, and respectively filter out the light with a set polarization direction in the adjusted light.

It should be noted that, firstly, FIG. 2 only illustrates a positional relationship and contour shapes of the display region 01 and the first imaging region 02, that is, the circular first imaging region 02 is embedded in the rectangular display region 01, which is not limited thereto, and may also be other corresponding relationship.

Wherein, the display region 01 is used for displaying, but not photographing; while the first imaging region 02 is used for photographing, but not displaying; and the two regions do not overlap with each other. The display unit provided in the display region 01 may be, for example, a liquid crystal display unit, or may also be an organic light emitting diode display unit, or other component that can be used for displaying.

Secondly, a specific structure of the filter will not be limited, as long as the polarization direction of the light incident into the filter can be varied, and after the polarization direction of the light is varied, linearly polarized light of a certain set polarization direction can be filtered out.

The filter is configured to adjust the polarization direction of the light incident into the filter, which refers to that the filter has an ability to vary the polarization direction of the incident light. The filter varies the polarization direction of the incident light, for example, it can vary the polarization direction of the incident light according to a preset rule; and the polarization direction of the incident light filtered out by the filter may be fixed, or may also be varied.

"Respectively filter out the light with a set polarization direction in the adjusted light" refers to "filter out the light with a certain polarization direction in the adjusted light"; when a same scene is photographed, the filter may adjust the light to have a plurality of polarization directions, and every time the polarization direction of the light is adjusted, the adjusted light is performed a filtered-out operation once, to correspondingly generate a filtering effect.

Thirdly, the light incident into the filter includes three portions: natural light, partially polarized light, and linearly polarized light. The filter filters out the ambient light and the linearly polarized light; no matter how the polarization direction of the light incident into the filter is varied, the filter has a same filtering effect on the ambient light (whose luminance is halved in theory), but has a different filtering effect on the linearly polarized light, that is, luminance of the linearly polarized light transmitting through the filter is different, and at some angles, the linearly polarized light will be completely filtered out; the linearly polarized light is light in the strong reflected light that conforms to Brewster's angle, which is also referred to as a polarization angle direction, and the filter is configured to filter out part or all of the portion of the linearly polarized light, so as to achieve an effect of reducing or eliminating the reflected light, wherein, Brewster's angle is a condition that should be satisfied when the reflected light is the linearly polarized light, after the natural light is reflected by a dielectric interface; and therefore, when an incident angle of the reflected light satisfies Brewster's angle, the reflected light is the linearly polarized light.

The strong reflected light incident into the filter includes the partially polarized light, and the filter can filter out a portion of polarized components in the partially polarized light; because components of different polarization directions are different in the partially polarized light, when the components of different polarization directions are filtered out, luminance is lower to different extents, to achieve an effect of weakening the reflected light to different extents.

Fourthly, it should be understood by those skilled in the art that, in the related art, the photographing process is generally completed by a camera; and on this basis, the first imaging region 02 in the display panel provided by the embodiment of the present disclosure corresponds to a region where the camera is mounted.

The display panel 100 provided by the embodiment of the present disclosure, on the basis of implementing display, further comprises the filter, the filter can vary the polarization direction of the linearly polarized light incident into the filter and vary the polarization direction of the polarized component in the partially polarized light; on this basis, even if polarization directions of the linearly polarized light incident into the filter are different in different scenes, the filter provided by the embodiment of the present disclosure can also achieve the effect of filtering out the linearly polarized light.

In this way, when the camera located in the first imaging region 02 is photographing, light incident into a photosensitive unit of the camera is light after the light with a set polarization direction is filtered out to a certain extent, and an image generated by a picture photographed by the camera is also an image after the reflected light is eliminated to a certain extent, and therefore, the problem of poor picture quality of the photographed image caused by the strong reflected light on a surface of a photographed object may be well improved.

In some embodiments, a filter includes: a polarization direction adjuster, configured to adjust a polarization direction of light incident into the filter; and an optical filter, provided on a light emergent side of the polarization direction adjuster, and configured to filter out polarized light having a set polarization direction in the adjusted light.

For example, the polarization direction adjuster may be a liquid crystal cell, and the optical filter may be a polarizer.

Figure 3:
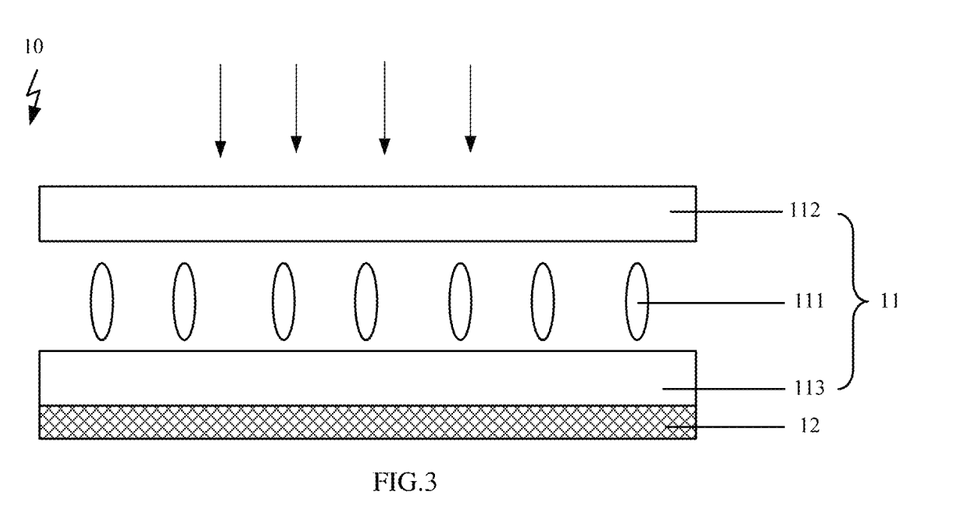
FIG. 3 is a structural schematic diagram of a filter provided by an embodiment of the present disclosure.

In some embodiments, as shown in FIG. 3, a filter 10 includes a liquid crystal cell 11 and a first polarizer 12 located on a light emergent side of the liquid crystal cell 11; the liquid crystal cell 11 includes a first liquid crystal layer 111, as well as a first electrode 112 and a second electrode 113 that are configured to drive the first liquid crystal layer 111 to deflect.

Wherein, the first electrode 112 and the second electrode 113 may be planar electrodes, or may also respectively include a plurality of sub-electrodes.

The first electrode 112 and the second electrode 113 are configured to drive the first liquid crystal layer 111 to deflect toward a same direction, it is not necessary to control the first liquid crystal layer 111 to deflect toward a plurality of directions; and therefore, in some embodiments, a first electrode 112 and a second electrode 113 are both planar electrodes.

When light propagates in an anisotropic medium, in addition to birefringence, there is also a phenomenon known as an optical rotation effect. The optical rotation effect refers to that when the light travels through a rotating transparent medium, it may gain angular momentum of a portion of the rotating transparent medium to increase rotational kinetic energy of the light. Here, by utilizing an optical rotation effect of a liquid crystal, the polarization direction of the linearly polarized light or the polarized component can be varied by changing an electric field applied to liquid crystal molecules, so that an angle between the polarization direction of the incident light and the first polarizer 12 can be automatically controlled, which saves troubles of a cumbersome mechanical structure and artificial cognition.

In addition, by properly controlling a deflection angle of the liquid crystal molecules, the first polarizer 12 may filter out the reflected linearly polarized light, and in a case where the reflected linearly polarized light is perpendicular to a polarization direction of the first polarizer 12, there is almost no reflected linearly polarized light in the light incident into the camera, which, thus, may effectively eliminate influence of the reflected light of an object surface on the photographic effect, with a simple structure, a matured principle, and convenience of implementation.

For example, when the polarization direction of the adjusted light or the polarized component is perpendicular to the polarization direction of the first polarizer, the light or the polarized component will not pass through the first polarizer to enter the camera on the light emergent side of the filter, so that an adverse effect of the strong reflected light on image quality of the photographed image can be eliminated.

Figure 4:
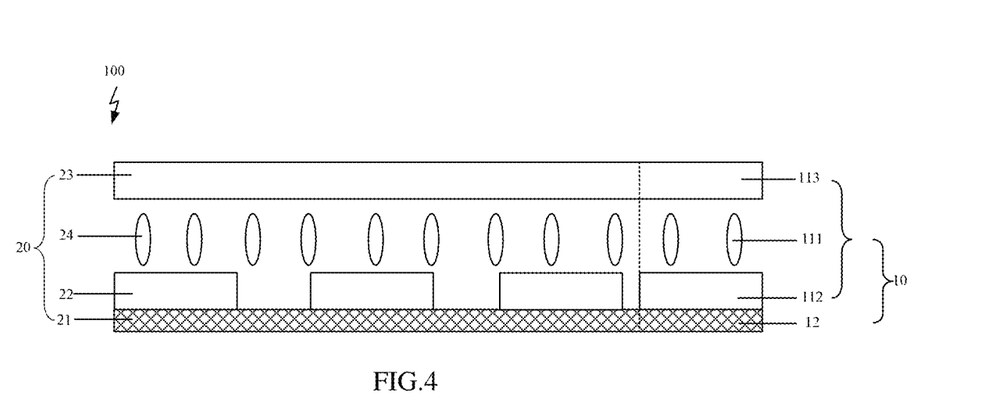
FIG. 4 is a structural schematic diagram of a display panel provided by an embodiment of the present disclosure.

In order to simplify a preparation process and make the display panel 100 light and thin, in some embodiments, as shown in FIG. 4, a display unit 20 includes a lower polarizer 21, and the lower polarizer 21 and a first polarizer 12 are integrally formed.

That is to say, the lower polarizer 21 and the first polarizer 12 are fabricated by using a same process, provided in a same layer and made of a same material, and have a same polarization direction. It may also be understood that the lower polarizer 21 extends to a first imaging region 02.

Wherein, the display unit 20 is a liquid crystal display unit, and further includes an upper polarizer and a color filter layer (not shown); a polarization direction of the upper polarizer is perpendicular to the polarization direction of the lower polarizer; the upper polarizer is provided close to a light emergent side of the display panel 100, and the lower polarizer is provided close to a back side of the display panel 100. As compared with the display unit 20, a filter 10 does not include an upper polarizer and a color filter layer.

In order to simplify a preparation process and make the display panel 100 light and thin, in some embodiments, as shown in FIG. 4, a display unit 20 includes a pixel electrode 22 and a common electrode 23; a first electrode 112 and the pixel electrode 22 are provided in a same layer and made of a same material; and a second electrode 113 and the common electrode 23 are provided in a same layer and made of a same material.

That is to say, the pixel electrode 22 and the first electrode 112 are formed by using a same preparation process, and the common electrode 23 and the second electrode 113 are formed by using a same preparation process.

Wherein, it should be understood by those skilled in the art that, in order to ensure normal display, a pixel electrode 22 is correspondingly provided in each sub-pixel of the display unit 20, and a plurality of pixel electrodes 22 are independently provided. The first electrode 112 is configured to drive a first liquid crystal layer 111 to deflect, and therefore, the first electrode 112 may include a plurality of independent sub-electrodes, or may also be a planar electrode. As shown in FIG. 4, the common electrode 23 and the second electrode 113 may have an integral structure, or may also be disconnected from each other.

In order to simplify a preparation process and make the display panel 100 light and thin, in some embodiments, as shown in FIG. 4, a display unit 20 includes a second liquid crystal layer 24; and the second liquid crystal layer 24 and a first liquid crystal layer 111 are provided in a same layer and made of a same material.

That is, the first liquid crystal layer 111 and the second liquid crystal layer 24 may be formed by using a same preparation process.

As described above, that is to say, as compared with the display unit 20, a filter 10 does not have a color filter layer and an upper polarizer; and other film layers (for example, a driving transistor, etc.) in the two may all be formed simultaneously. A driving mode of the first liquid crystal layer 111 and the second liquid crystal layer 24 may be Integrated Circuit (IC) bonding, wherein, the IC bonding has a single layer structure; or may also be a Chip On Film (COF) solution, wherein, the COF can narrow a frame of the display panel 100.

Alternatively, when a light emergent side of the filter and a light emergent side of the display unit are located on a same side, what is photographed by the first camera is an object on an opposite side of the light emergent side of the display unit, that is, the first camera is a rear camera, and here, a polarizer in the filter may be located in a same layer as a polarizer provided on the light emergent side of the display unit, for example, the two are provided in a same layer and made of a same material, or have an integral structure.

Figure 5:
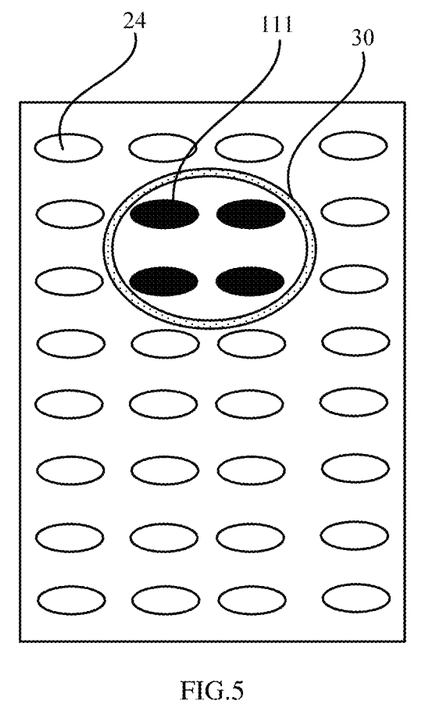
FIG. 5 is a positional relationship diagram of a first liquid crystal layer and a second liquid crystal layer provided by an embodiment of the present disclosure.

In some embodiments, as shown in FIG. 5, an insulation barrier 30 is provided between a first liquid crystal layer 111 and a second liquid crystal layer 24.

For example, the insulation barrier is provided between the first liquid crystal layer and the second liquid crystal layer in a direction parallel to the display panel, and configured to isolate the first liquid crystal layer from the second liquid crystal layer.

That is, the insulation barrier 30 is used for isolating the first liquid crystal layer 111 from the second liquid crystal layer 24; and a specific structure of the insulation barrier 30 will not be limited, as long as the first liquid crystal layer 111 can be isolated from the second liquid crystal layer 24; that is to say, the insulation barrier 30 is arranged at a position adjacent to the first liquid crystal layer 111 and the second liquid crystal layer 24. The insulation barrier 30 may have an integral structure, or may also include a plurality of sub-portions.

Wherein, the insulation barrier 30 may be made of, for example, a transparent material; further, the insulation barrier 30 may be made of, for example, a transparent adhesive.

In addition, in FIG. 5, in order to distinguish the first liquid crystal layer 111 from the second liquid crystal layer 24, the two are filled in different manners; however, it is not limited that the two must be made of different materials, and the two may still be provided in a same layer and made of a same material.

As described above, in order to avoid that the second liquid crystal layer 24 deflects as affected by an electric field, when the first liquid crystal layer 111 is driven, or avoid that the first liquid crystal layer 111 is affected by an electric field, when the second liquid crystal layer 24 is driven, that is, in order to achieve better transition with a display region 01 and exhibit a better edge display effect, the insulation barrier 30 (for example, a sealant) is provided to separate the first liquid crystal layer 111 and the second liquid crystal layer 24 that are respectively located in the display region 01 and a first imaging region 02.

Figure 6:
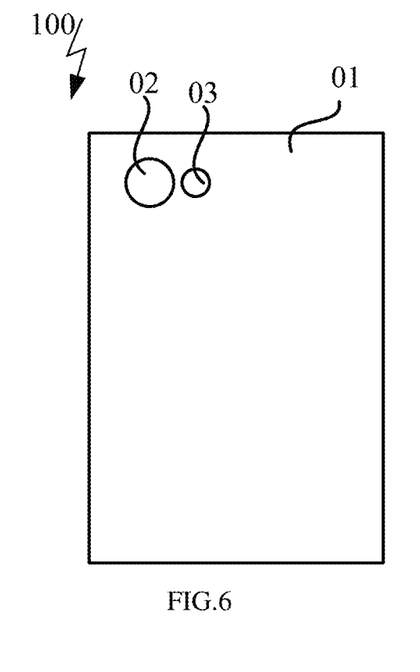
FIG. 6 is a region division diagram II of a display panel provided by an embodiment of the present disclosure.

In some embodiments, as shown in FIG. 6, a display panel 100 further comprises a second imaging region 03, the second imaging region 03 is provided with a light transmitting unit 40, the light transmitting unit 40 is configured to transmit light incident into the light transmitting unit 40; and the light transmitting unit 40 is a hollow portion.

Wherein, as shown in FIG. 6, a display region 01, a first imaging region 02 and the second imaging region 03 are mutually independent, and do not overlap with one another; the display region 01 does not photograph, and the first imaging region 02 and the second imaging region 03 do not display.

In some embodiments, in order to increase a screen-to-body ratio of a display panel 100, a first imaging region 02 and a second imaging region 03 do not have to be too large, as long as lenses of cameras may be placed therein correspondingly.

A light transmitting unit 40 is a hollow portion, that is, the light transmitting unit 40 is a through hole on the display panel 100.

For example, the display panel 100 may be cut by using a special shape cutting technology, a laser tape cutting technology, a Computerized Numerical Control Machine (CNC) cutting technology, and so on.

The display panel 100 provided by the present disclosure comprises the first imaging region 02 and the second imaging region 03; the display panel 100 may be used in a dual-camera module; and addition of a filter 10 does not affect use of other functions (for example, black-and-white dual photography and zoom dual photography) of the dual-camera module.

In addition, in an application process, in order to make a photographic effect better, the display panel 100 collocates with a long-focus camera assembly; while a long-focus lens is thicker, so the light transmitting unit 40 is designed as a hollow portion, which may widen a selection range of the camera.

In some embodiments, as shown in FIG. 6, a display panel 100 further comprises a second imaging region 03, the second imaging region 03 is provided with a light transmitting unit 40, the light transmitting unit 40 is configured to transmit light incident into the light transmitting unit 40; a display unit 20 includes a first transparent base and a second transparent base; and the light transmitting unit 40 includes portions of the first transparent base and the second transparent base that extend to the second imaging region 03.

For example, the first transparent base is a base on an array substrate, the second transparent base is a base on a color filter substrate; the first transparent base and the second transparent base extend from a display region 01 to the second imaging region 03; and the light transmitting unit 40 is a structure constituted by the portions of the first transparent base and the second transparent base that extend to the second imaging region 03.

Here, if a thinner camera is selected, it is not necessary to cut the display panel 100; as compared with the display unit 20, the light transmitting unit 40 retains only the portions of the first transparent base and the second transparent base in the second imaging region 03, it is not subjected to liquid crystal dropping, and do not have an upper polarizer and a lower polarizer, a color filter layer, a pixel structure, and so on; after the first liquid crystal layer 111 is isolated from the second liquid crystal layer 24 by an insulation barrier 30, the second imaging region 03 is isolated from the display region 01 and the first imaging region 02, to form an empty cell region without a liquid crystal, so that a whole screen is visually integrated and has functions for hiding the camera.

In addition, the entire display panel 100 can change a polarization state of reflected light incident into the camera without special shape cutting, which can effectively eliminate strong reflected light on a surface of a photographed object at a suitable angle, and improve a selfie effect.

Here, a display device with dual cameras comprises, for example, solutions of coordinating a main camera and an auxiliary camera as color & black-and-white, or wide-angle & long-focus, etc.; and these different solutions may achieve effects such as depth blur and lossless optical zoom.

Figure 7:
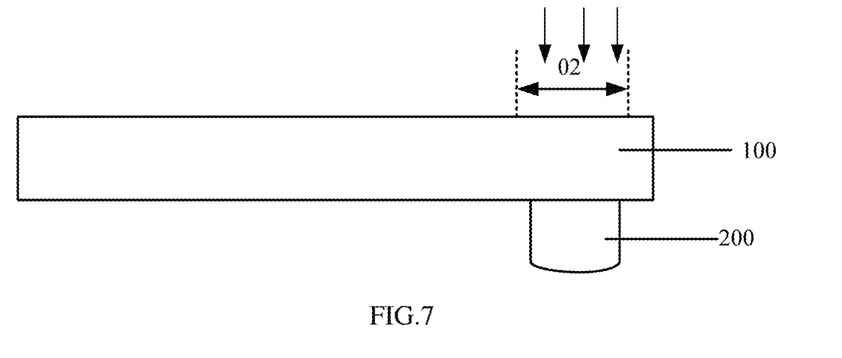
FIG. 7 is a structural schematic diagram I of a display device provided by an embodiment of the present disclosure.

An embodiment of the present disclosure further provides a display device, as shown in FIG. 7, comprising the above-described display panel 100 and a first camera 200;

wherein, the first camera 200 is provided on a light emergent side of a filter, and is in positional correspondence with a first imaging region 02.

Those skilled in the art should understand that the first imaging region 02 should be larger than or equal to a working region of the first camera 200, and will not shield a lighting component of the first camera 200. The first camera may be a front camera, or may also be a rear camera. Usually a camera for photographing a picture (for example, a selfie) of an object opposite to a light emergent side of the display panel 100 is referred to as a front camera, and a camera for photographing a picture of an object opposite to a back side of the display device is referred to as a rear camera. The first camera 200 may be selected with reference to the related art known to the inventor(s), which will not be limited in the embodiments of the present disclosure.

Wherein, the light emergent side of the filter refers to a direction in which light is emitted out after entering the filter and filtered by the filter. The light emergent side of the filter may be the light emergent side of the display device, or may also be an opposite side of the light emergent side of the display device.

Further, a back side of the display panel 100 is opposite to the light emergent side of the display panel 100, and the display device usually may further comprise a protective cover plate provided on the light emergent side of the display panel 100.

In the display device provided by the embodiment of the present disclosure, the first camera 200 is provided in the first imaging region 02, the first imaging region 02 of the display panel 100 is provided with the filter 10, the filter 10 changes a polarization state of light entering the first camera 200, and by using controllable design of the polarization direction and a determination method of a reflective region, the filter 10 filters out linearly polarized light in the light before the light enters the first camera 200, so as to better balance a picture effect.

A component of the first camera 200 may include, for example, a Complementary Metal Oxide Semiconductor (CMOS) photosensitive element for imaging on the CMOS photosensitive element.

In some embodiments, a first camera 200 further includes an infrared filter, the infrared filter may be provided to correct a daytime color cast problem, or may also improve night luminance when used at night, to reduce snowflake noises, so that a picture is clearer and softer.

In some embodiments, a first camera 200 is a front camera, and the first camera 200 is provided on a side of a display panel 100 that is opposite to a light emergent side.

The first camera 200 is placed on the side of the display panel 100 that is opposite to the light emergent side, so that the first camera 200 and a screen may also exhibit an integration effect, and the display device may be light and thin.

In some embodiments, a display panel comprises a second imaging region 03; a display device further comprises a second camera 400, the second camera 400 is provided on a light emergent side of the second imaging region 03, and the light emergent side of the second imaging region 03 and a light emergent side of a filter 10 are both consistent with a light emergent side of the display device.

Figure 8:
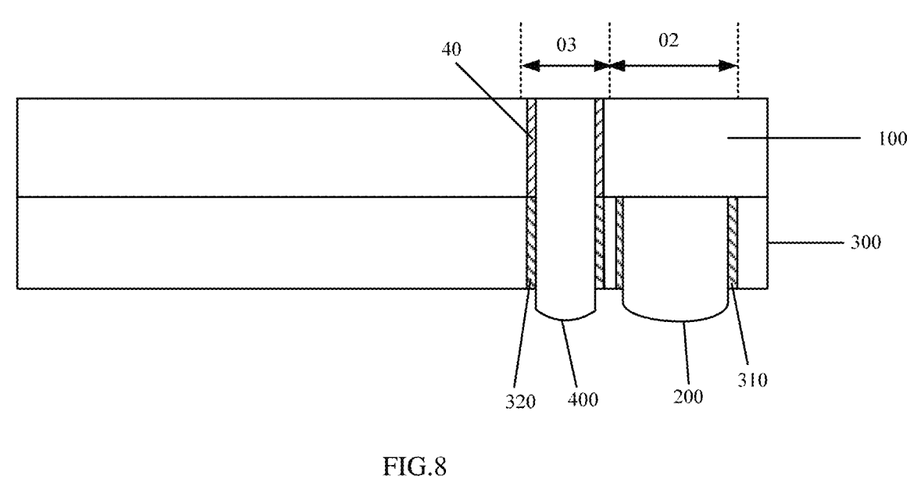
FIG. 8 is a structural schematic diagram II of a display device provided by an embodiment of the present disclosure.

In some embodiments, as shown in FIG. 8, a display panel comprises a second imaging region 03; a display device further comprises a second camera 400, the second camera 400 is provided on a light emergent side of the second imaging region 03, and the light emergent side of the second imaging region 03 and a light emergent side of a filter 10 are both consistent with an opposite side of a light emergent side of the display device.

Wherein, the opposite side of the light emergent side of the display device is also referred to as a backlight side of the display device.

Optionally, the light emergent side of the second imaging region may be located on a different side from the light emergent side of the filter.

As shown in FIG. 8, in a case where a light transmitting unit 40 is a hollow portion, the second camera 400 may be placed within the light transmitting unit 40. At this time, the second camera 400 may be a long-focus camera, or may also be a short-focus camera.

The first camera 200 and the second camera 400 both are front cameras or both are rear cameras; the first camera 200 and the second camera 400 as described above have a reciprocal main-auxiliary relationship, for example, the first camera 200 may be an auxiliary camera, and the second camera 400 may be a main camera. The main camera may be a conventional camera, or may also be a long-focus camera, a wide-angle camera, etc., for capturing a real picture when a selfie is taken. The auxiliary camera functions for balancing and optimizing strong reflected light.

In some embodiments, as shown in FIG. 8, a display device further comprises a backlight module 300, the backlight module 300 includes a first hollow region 310, and a first camera 200 is provided in the first hollow region 310.

Wherein, in FIG. 8, in order to clearly illustrate the first hollow region 310, the first hollow region 310 is filled, and a cross-sectional area of the first hollow region 310 needs to ensure placement of a lens of the first camera 200; from the perspective as illustrated in FIG. 8, after the first camera 200 is placed into the first hollow region 310, it may shield the first hollow region 310 to a certain extent.

Here, the backlight module 300 is cut, and the first camera 200 is placed within the first hollow region 310 and located below a filter 10, so that the first camera 200 and the screen exhibit an integration effect.

In order to implement dual-camera photography, in some embodiments, as shown in FIG. 8, a display panel further comprises a second imaging region 03, a display device further comprises a second camera 400, a backlight module 300 further includes a second hollow region 320, and the second camera 400 is provided in the second hollow region 320.

Wherein, the second camera 400 may be placed in the second hollow region 320, or may also extend into the display panel 100, according to a structure of a light transmitting unit.

In some embodiments, a display device further comprises a processing unit, and the processing unit is used for processing pictures photographed by a first camera 200 and a second camera 400.

Figure 9:
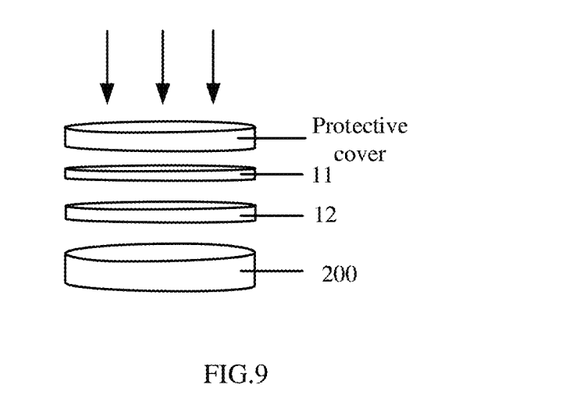
FIG. 9 is a schematic diagram of relationship between a first camera and a filter provided by an embodiment of the present disclosure.

A filtering principle of the display device provided by the embodiment of the present disclosure is as below: in the present disclosure, by utilizing the optical rotation effect of the liquid crystal molecules, rotation of the polarization direction is controllably performed on the linearly polarized light by applying different voltages to the liquid crystal molecules. As shown in FIG. 9, when light travels through the liquid crystal cell 11 in a working process, the polarization direction of the reflected linearly polarized light is rotated due to the optical rotation effect of the liquid crystal molecules, and the light passes through the first polarizer 12, and creates an image onto the CMOS photosensitive element. A driver IC adjusts a voltage applied to the liquid crystal cell 11 to change alignment of the liquid crystal, so as to rotate the polarization direction of the reflected linearly polarized light, so that the first polarizer 12 filters out the linearly polarized light to different extents, and luminance of the light entering the CMOS photosensitive element is different, so different images can be obtained. In this way, when the reflected linearly polarized light intersects with the polarization direction of the first polarizer 12, luminance of the reflected linearly polarized light varies as an intersection angle varies; and when the reflected linearly polarized light is perpendicular to the polarization direction of the first polarizer 12, the reflected linearly polarized light can be eliminated.

Figure 10:
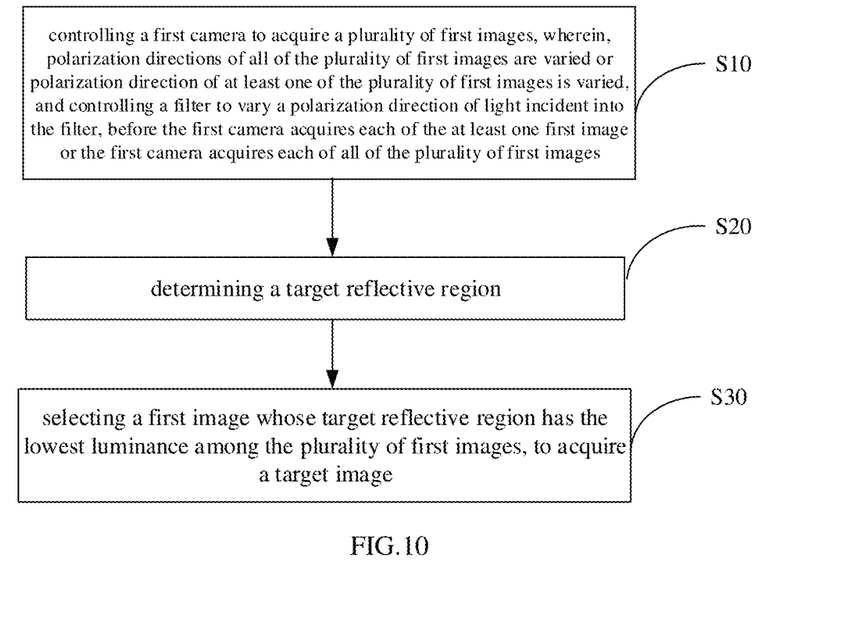
FIG. 10 is a flow chart I of an image acquiring method of a display device provided by an embodiment of the present disclosure.

An embodiment of the present disclosure further provides an image acquiring method of the above-described display device, as shown in FIG. 10, comprising:

S10: controlling a first camera to acquire a plurality of first images, wherein, polarization directions of all of the plurality of first images are varied or polarization direction of at least one of the plurality of first images is varied, and controlling a filter to vary a polarization direction of light incident into the filter, before the first camera acquires each of the at least one first image or the first camera acquires each of all of the plurality of first images.

For example, controlling a first camera 200 to acquire a plurality of first images, wherein, every time before the first camera 200 acquires a first image, a filter 10 is controlled to vary a polarization direction of light incident into the filter 10.

Alternatively, before a first one of the first images is acquired, the polarization direction of the light is not varied; while every time before a first image is acquired thereafter, the filter is controlled to vary the polarization direction of the light, for example, except for the first one of the first images, polarization directions of light corresponding to the remaining first images are all different.

Figure 11:
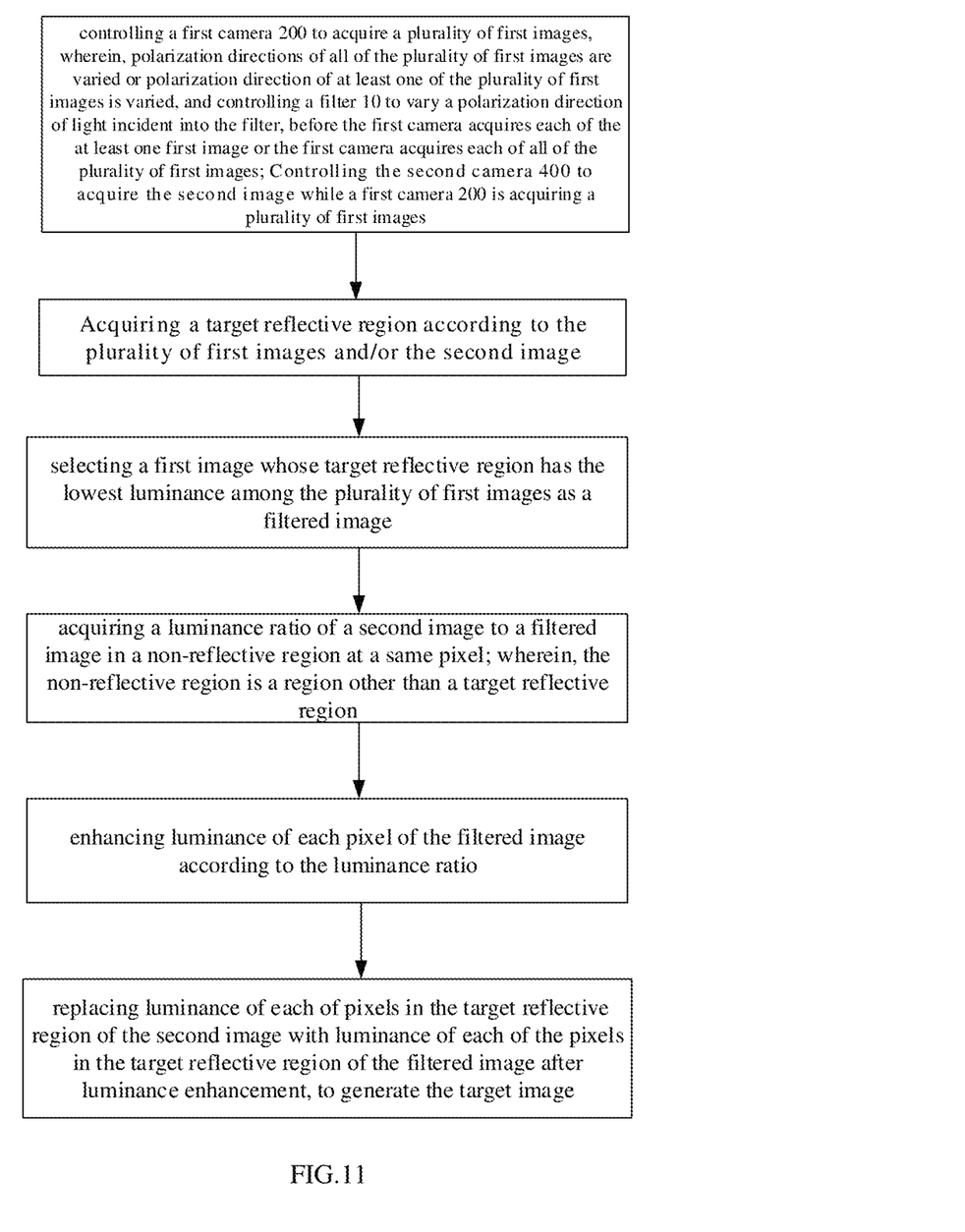
FIG. 11 is a flow chart II of the image acquiring method of the display device provided by the embodiment of the present disclosure.

The filter 10 includes a first liquid crystal layer 111; as shown in FIG. 11, for example, wherein, a polarization direction of light is varied, before the first camera acquires each of the plurality of first images; or polarization direction of at least one of the plurality of first images is varied, before the first camera acquires each of the at least one first image, liquid crystal molecules in the first liquid crystal layer 111 may be controlled to deflect by a set angle.

For example, every time before the first camera 200 acquires a first image, liquid crystal molecules in the first liquid crystal layer 111 may be controlled to deflect by a set angle.

For example, the filter further includes: a first electrode and a second electrode, configured to drive the first liquid crystal layer to deflect; and the controlling a filter to vary a polarization direction of light incident into the filter, before the first camera acquires each of the remaining first images except for the at least one first image, includes: applying a voltage to the first electrode and the second electrode for a different first image in the remaining first images except for the at least one first image, so that the first electrode and the second electrode have different voltage differences, to control liquid crystal molecules in the first liquid crystal layer to deflect by a set angle, the liquid crystal molecules deflecting by different set angles, with respect to different first images.

For example, the controlling the filter to vary a polarization direction of light incident into the filter, before the first camera acquires each of the remaining first images, includes: applying a voltage to the first electrode and the second electrode with respect to a different first image in the remaining first images except for the first one of the first images, so that the first electrode and the second electrode have different voltage differences, to control the liquid crystal molecules in the first liquid crystal layer to deflect by a set angle, wherein, with respect to different first images, the liquid crystal molecules deflect by different set angles.

Wherein, a speed at which the first camera 200 continuously acquires a plurality of first images should be relatively fast; the first camera 200 acquires a first picture, and the liquid crystal molecules in the first liquid crystal layer 111 are controlled to deflect by an angle; as the deflection angle of the liquid crystal molecules in the first liquid crystal layer 111 varies, a filtering effect on strong reflected light also varies. In this way, with respect to a region without any strong reflected light, luminance of the plurality of first images differs slightly, while with respect to a region with strong reflected light, luminance of the plurality of first images differs greatly.

In order to improve the filtering effect on the strong reflected light, in some embodiments, a first camera 200 continuously acquires N first images; and every time the first camera 200 acquires a first image, liquid crystal molecules in a first liquid crystal layer 111 are controlled to deflect by (M/N)°, where, N is an integer greater than or equal to 3, and M is a maximum angle range at which the liquid crystal molecules can deflect, for example, an ideal angle is 180°.

The larger the number of first images acquired, the better the effect of the finally obtained image with the reflected light eliminated; however, the number of first images acquired should be reasonably selected in comprehensive consideration of a drive capability of an electronic apparatus.

Figure 12:
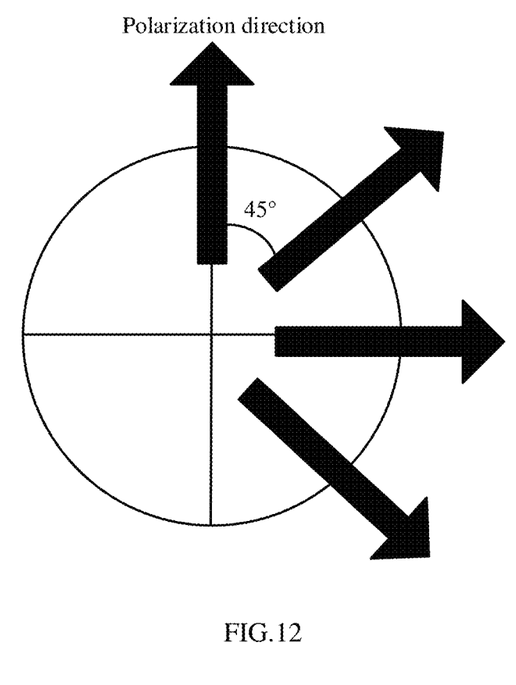
FIG. 12 is a variation diagram of a polarization direction provided by an embodiment of the present disclosure.

In some embodiments, as shown in FIG. 12, a first camera 200 continuously acquires four first images, and every time the first camera 200 acquires a first image, liquid crystal molecules in a first liquid crystal layer 111 are controlled to deflect by 45°.

In some embodiments, a display device comprises a second camera 400, and the image acquiring method further comprises:

S15: controlling the second camera 400 to acquire a second image, while a first camera 200 is acquiring a plurality of first images.

While the first camera 200 is acquiring a first image, the second camera 400 acquires a second image, such that the first image and the second image are scenes photographed with respect to a same picture. However, since a transmitting unit in front of the second camera 400 is not provided with a polarizer, light incident into the second camera 400 is not lost, and luminance of the second image is higher than luminance of the first image.

S20: determining a target reflective region (a region where reflected light appears).

For example, the plurality of first images may be compared, to determine a region whose luminance variation is relatively obvious as the target reflective region; when the display device comprises the second camera 400, it may also be a case where the second camera 400 acquires the second image, and the target reflective region is acquired by analyzing the second image.

Wherein, as the filtering effect on the reflected linearly polarized light is enhanced, luminance of the target reflective region is gradually lowered; and therefore, among the plurality of first images, an image whose target reflective region has the lowest luminance is just an image having a best reflected light filtering effect.

In some embodiments, as shown in FIG. 11, a first image and a second image respectively include a plurality of pixels, and the determining a target reflective region, includes:

Comparing luminance of a plurality of first images at a same pixel, taking a region composed of pixels whose luminance fluctuations at the same pixel are higher than a set value as a first estimated reflective region; and taking the first estimated reflective region as the target reflective region.

Here, the set value may be set in advance, or may also be obtained through processing by using a set processing method, according to an image photographed every time.

Exemplarily, luminance of a pixel No. 10 of a first image I is compared with luminance of a pixel No. 10 of a first image II, a luminance difference is smaller than the set value; and luminance of a pixel No. 11 of the first image I is compared with luminance of a pixel No. 11 of the first image II, a luminance difference is larger than the set value. Each pixel is compared one by one, and a region composed of pixels whose luminance differences are larger than the set value is taken as the first estimated reflective region, and the first estimated reflective region may be a large region, or may also include a plurality of sub-estimated reflective regions.

Wherein, luminance of the plurality of first images at the same pixel is compared; the plurality of first images may be compared in a pairwise manner, or the plurality of first images may also be compared simultaneously; a luminance difference fluctuation representative value (for example, a variance and a standard deviation, etc.) at the same pixel is calculated, and it is judged whether or not the pixel belongs to the first estimated reflective region according to a magnitude of the representative value.

In some embodiments, as shown in FIG. 11, a first image and a second image respectively include a plurality of pixels, and the determining a target reflective region, includes:

Acquiring an average luminance value of pixels in the second image, taking a region composed of pixels whose luminance is higher than the average luminance value as a second estimated reflective region, and taking the second estimated reflective region as the target reflective region.

Wherein, a pixel in the target reflective region generally has luminance much higher than an average level or close to saturation (the sensor cannot detect a signal), while adjacent pixels within the target reflective region have slight luminance variation, which generally compose a connected region.

In order to further improve accuracy of determination and information complementation for the target reflective region, and improve the filtering effect on the reflected light, in some embodiments, as shown in FIG. 11, a first image and a second image respectively include a plurality of pixels, and the determining a target reflective region, includes:

Comparing luminance of a plurality of first images at a same pixel, taking a region composed of pixels whose luminance fluctuations at the same pixel are larger than a set value as a first estimated reflective region, acquiring an average luminance value of pixels in the second image, taking a region composed of pixels whose luminance is higher than the average luminance value as a second estimated reflective region, and taking a region composed of pixels located in both the first estimated reflective region and the second estimated reflective region as the target reflective region.

S30: selecting a first image whose target reflective region has the lowest luminance among the plurality of first images, to acquire a target image.

In order to further improve quality of the target image, in some embodiments, S30 includes:

S31: selecting a first image whose target reflective region has the lowest luminance among the plurality of first images as a filtered image.

S32: performing luminance compensation on the filtered image according to a filtering degree of the filter, to generate the target image.

Wherein, the filtering degree may be obtained by calculation, or may also be preset according to experience.

In some embodiments, S32 includes:

S321: acquiring a luminance ratio of a second image to a filtered image in a non-reflective region at a same pixel; wherein, the non-reflective region is a region other than a target reflective region.

Wherein, theoretically, a luminance ratio of each pixel in the region other than the target reflective region obtained by comparing the second image with the filtered image should be the same, and the luminance ratio represents the amount of ambient light filtered out by the first polarizer 111. Of course, if there are a plurality of luminance ratios, a luminance ratio with the highest probability of occurrence may be selected.

A luminance ratio at a same pixel is, for example, a ratio of luminance of a pixel No. 50 on the filtered image to luminance of a pixel No. 50 on the second image.

S322: enhancing luminance of each pixel of the filtered image according to the luminance ratio, to generate the target image.

That is, the luminance of each of pixels of the filtered image is enhanced at this time as much as that filtered out by the first polarizer 111. If the luminance ratio is 2, luminance of each pixel of the filtered image is multiplied by 2, and an image composed of pixels after luminance enhancement may be taken as the target image.

Wherein, the above-described steps may be completed by a processing unit in the display device.

In order to make luminance of the target image more accurate, in some embodiments, as shown in FIG. 11, S32 includes:

S321': acquiring a luminance ratio of a second image to a filtered image in a non-reflective region at a same pixel; wherein, the non-reflective region is a region other than a target reflective region.

S322': enhancing luminance of each of pixels in the target reflective region of the filtered image according to the luminance ratio.

S323': replacing luminance of each of pixels in the target reflective region of the second image with luminance of each of the pixels in the target reflective region of the filtered image after luminance enhancement, to generate the target image.

That is to say, the non-reflective region has no reflected light, and at this time, in the second image acquired by the second camera 400, the portion in the non-reflective region is the most realistic picture. A light-emitting region has reflected light, and the filter is provided in front of the first camera 200, at which time, the first image acquired by the first camera 200 is an image having the reflected light filtered out, and the filtered image is an image having a best reflected light filtering effect; in the filtered image after luminance enhancement, the portion of the reflective region is a picture having the best effect after the reflected light is eliminated. Therefore, the luminance of each of the pixels in the target reflective region of the second image is replaced with the luminance of each of the pixels in the target reflective region of filtered image after compensation, and the second image after replacement has the best display effect, and is taken as the target image.

In the image acquiring method of the display device provided by the embodiment of the present disclosure, the plurality of first images having different polarization angles are acquired in a single photographing process, the second image having not subjected to polarization is photographed, the target reflective region is determined according to luminance ratios of different images, the plurality of first images are compared with the second image, and the luminance of the target reflective region is replaced with luminance exhibiting a suitable display effect, to acquire the target image, so as to achieve a photographic effect of balancing the strong reflected light.

Hereinafter, it is illustrated with a specific embodiment:

As shown in FIG. 12, no voltage is applied to a liquid crystal cell 11, at which time a polarization direction is 0°, and a first camera 200 acquires a first image I; a voltage is applied to the liquid crystal cell 11, so that the polarization direction deflects by 45°, at which time the polarization direction is 45°, and the first camera 200 acquires a first image II; a voltage is applied to the liquid crystal cell 11, so that the polarization direction deflects by 45°, at which time the polarization direction is 90°, and the first camera 200 acquires a first image III; and a voltage is applied to the liquid crystal cell 11, so that the polarization direction deflects by 45°, at which time the polarization direction is 135°, and the first camera 200 acquires a first image IV. While the first camera 200 is acquiring the first image, a second camera 400 acquires a second image.

A processing unit compares luminance amplitudes of the four first images acquired by the first camera 200 at a same pixel; it may be known according to theoretical analysis that, a polarization degree is greater in a position where a luminance difference is greater at the same pixel, and a first estimated reflective region may be preliminarily determined by comparing the luminance difference with a preset value at the same pixel.

An average luminance value of pixels in the second image is acquired, and a region composed of pixels whose luminance is higher than the average luminance value is taken as a second estimated reflective region.

A region composed of pixels located in both the first estimated reflective region and the second estimated reflective region is taken as a target reflective region.

The four first images acquired are arranged in a descending order according to an intensity of the target reflective region (for example, an order of the first image II, the first image III, the first image IV, and the first image I), and the first image whose target reflective region has the lowest luminance (the first image I) and the determined target reflective region pixel position are output.

With respect to the first image I and the second image, a luminance ratio at the same pixel is acquired in a region other than the determined non-reflective region, luminance of the target reflective region of the first image I is enhanced according to the ratio, and the pixel of the target reflective region of the first image I and the pixel of the non-reflective region of the second image are recombined as the target image.

The present disclosure provides the display panel, the display device and the image acquiring method thereof, and on the basis of implementing display, the filter is comprised; the filter can vary the polarization direction of the linearly polarized light incident into the filter; and on this basis, even if polarization directions of the linearly polarized light incident into the filter are different in different scenes, the filter provided by the embodiment of the present disclosure can also achieve the effect of filtering out the linearly polarized light. In this way, when the camera located in the imaging region photographs, the light incident into the photosensitive unit of the camera is the light after a portion or all of the linearly polarized light is filtered out, the image generated by the picture photographed by the camera is also the image after the reflected light is eliminated, and therefore, the problem of poor picture quality of the photographed image caused by the strong reflected light on the surface of the photographed object may be well improved.

The following statements should be noted:

(1) Unless otherwise defined, the same reference number is denoted as the same meaning in the embodiments of the accompanying drawings of the present disclosure.

(2) The accompanying drawings involve only the structure(s) in connection with the embodiment(s) of the present disclosure, and other structure(s) can be referred to common design(s).

(3) For the purpose of clarity only, in accompanying drawings for illustrating the embodiment(s) of the present disclosure, the thickness and size of a layer or a structure may be enlarged, that is, the accompanying drawings are not drawn according to the actual scale. However, it should be understood that, in the case in which a component or element such as a layer, film, region, substrate or the like is referred to be "on" or "under" another component or element, it may be directly on or under the another component or element or a component or element is interposed therebetween.

(4) In case of no conflict, features in one embodiment or in different embodiments can be combined to obtain a new embodiment.

What are described above is related to the specific embodiments of the disclosure only and not limitative to the scope of the disclosure. The protection scope of the disclosure shall be based on the protection scope of the claims.

The application claims priority to the Chinese patent application No. 201811162881.1, filed Sep. 30, 2018, the disclosure of which is incorporated herein by reference as part of the application.

The invention claimed is:

1. A display panel, comprising:
a first imaging region, the first imaging region being provided with a filter;
wherein, the filter is configured to adjust a polarization direction of light incident into the filter, and configured to filter out polarized light having a set polarization direction in the adjusted light,
wherein the filter includes:
a polarization direction adjuster, configured to adjust the polarization direction of the light incident into the filter;
an optical filter, provided on a light emergent side of the polarization direction adjuster, and configured to filter out the polarized light having the set polarization direction in the adjusted light; and
the polarization direction adjuster includes a liquid crystal cell, and the optical filter includes a first polarizer located on a light emergent side of the liquid crystal cell;
the liquid crystal cell includes a first liquid crystal layer, a first electrode and a second electrode which are configured to drive the first liquid crystal layer to deflect,
wherein the display panel further includes a display region, the display region is provided with a display unit, the display unit is configured to display an image, and the display unit includes a second liquid crystal layer;

wherein the second liquid crystal layer and the first liquid crystal layer are provided in a same layer and made of a same material.

2. The display panel according to claim 1, wherein, the filter is controllable, such that the polarization direction of the adjusted light is variable.

3. The display panel according to claim 1,
wherein, the display unit includes:
a pixel electrode and a common electrode, configured to drive the second liquid crystal layer to display an image; and
a lower polarizer, located on a light emergent side of the second liquid crystal layer, or an opposite side of the light emergent side of the second liquid crystal layer.

4. The display panel according to claim 3, wherein, the lower polarizer and the first polarizer are integrally formed.

5. The display panel according to claim 3, wherein, the first electrode and the pixel electrode are provided in a same layer and made of a same material, and the second electrode and the common electrode are provided in a same layer and made of a same material.

6. The display panel according to claim 3, further comprising:
an insulation barrier, provided between the first liquid crystal layer and the second liquid crystal layer in a direction parallel to the display panel, and configured to isolate the first liquid crystal layer from the second liquid crystal layer.

7. The display panel according to claim 3, further comprising:
a second imaging region, the second imaging region being provided with a light transmitting unit, and the light transmitting unit being configured to transmit light incident into the light transmitting unit;
wherein, the light transmitting unit is a hollow portion; or,
the display unit includes a first transparent base and a second transparent base, the first transparent base and the second transparent base sandwich the second liquid crystal layer, the pixel electrode and the common electrode, and the light transmitting unit includes portions of the first transparent base and the second transparent base that extend to the second imaging region.

8. A display device, comprising:
a display panel according to claim 1; and
a first camera, provided on a light emergent side of the filter and corresponding to the first imaging region in a position.

9. The display device according to claim 8, wherein, the display panel comprises a second imaging region, the second imaging region is provided with a light transmitting unit, and the light transmitting unit is configured to transmit light incident into the light transmitting unit;
the display device further comprises:
a second camera, provided on a light emergent side of the light transmitting unit.

10. The display device according to claim 9, wherein, the light emergent side of the light transmitting unit and the light emergent side of the filter are all located on a light emergent side of the display device or an opposite side of the light emergent side of the display device,
the display device further comprises a backlight module, the backlight module includes a first hollow region, and the first camera is provided in the first hollow region, the backlight module includes a second hollow region, and the second camera is provided in the second hollow region.

11. An image acquiring method of the display device according to claim 8, comprising:
controlling a first camera to acquire a plurality of first images, wherein polarization directions of all of the plurality of first images are varied or polarization direction of at least one of the plurality of first images is varied, and controlling a filter to vary a polarization direction of light incident into the filter, before the first camera acquires each of the at least one first image or the first camera acquires each of all of the plurality of first images;
determining a target reflective region; and
selecting one of the first images whose target reflective region has a lowest luminance among the plurality of first images, to acquire a target image.

12. The image acquiring method according to claim 11, wherein, the selecting one of the first images whose target reflective region has the lowest luminance among the plurality of first images, to acquire a target image, includes:
selecting one of the first images whose target reflective region has the lowest luminance among the plurality of first images as a filtered image;
performing luminance compensation on the filtered image according to a filtering degree of the filter, to acquire the target image.

13. The image acquiring method according to claim 11, wherein, the filter includes:
a first liquid crystal layer;
a first electrode and a second electrode, configured to drive the first liquid crystal layer to deflect;
the controlling a filter to vary a polarization direction of light incident into the filter, before the first camera acquires each of the at least one first image or the first camera acquires each of all of the plurality of first images, includes:
applying a voltage to the first electrode and the second electrode for a different first image in the at least one first image or for a different first image in all of the plurality of first images, so that the first electrode and the second electrode have different voltage differences, to control liquid crystal molecules in the first liquid crystal layer to deflect by a set angle, the liquid crystal molecules deflecting by different set angles for the different first images.

14. The image acquiring method according to claim 12, wherein, the display device comprises a second camera;
the image acquiring method further comprises:
controlling the second camera to acquire a second image, while the first camera is acquiring the plurality of first images.

15. The image acquiring method according to claim 14, wherein, the first image and the second image respectively include a plurality of pixels,
the determining a target reflective region, includes:
comparing luminance of the plurality of first images at a same pixel, taking a region composed of pixels whose luminance fluctuations are larger than a set value as a first estimated reflective region, and taking the first estimated reflective region as the target reflective region;
or, acquiring an average luminance value of pixels in the second image, taking a region composed of pixels whose luminance is larger than the average luminance value as a second estimated reflective region, and taking the second estimated reflective region as the target reflective region;

or, comparing luminance of the plurality of first images at the same pixel, taking the region composed of the pixels whose luminance fluctuations are larger than the set value as the first estimated reflective region, acquiring the average luminance value of the pixels in the second image, taking the region composed of the pixels whose luminance is larger than the average luminance value as the second estimated reflective region, and taking a region composed of pixels located in both the first estimated reflective region and the second estimated reflective region as the target reflective region.

16. The image acquiring method according to claim 14, wherein, the first image and the second image respectively include a plurality of pixels, the performing luminance compensation on the filtered image according to a filtering degree of the filter, to acquire the target image, includes:

acquiring a luminance ratio of the second image to the filtered image in a non-reflective region at a same pixel; wherein, the non-reflective region is a region other than the target reflective region;

enhancing luminance of each of the pixels of the filtered image according to the luminance ratio, to generate the target image.

17. The image acquiring method according to claim 14, wherein, the first image and the second image respectively include a plurality of pixels, and the performing luminance compensation on the filtered image according to a filtering degree of the filter, to acquire the target image, includes:

acquiring the luminance ratio of the second image to the filtered image in the non-reflective region at the same pixel; wherein, the non-reflective region is a region other than the target reflective region;

enhancing the luminance of each of the pixels in the target reflective region of the filtered image according to the luminance ratio; and replacing luminance of each of the pixels in the target reflective region of the second image with luminance of each of the pixels in the target reflective region of the filtered image after luminance enhancement, to generate the target image.

\* \* \* \* \*